United States Patent
Chung et al.

(10) Patent No.: US 7,671,866 B2
(45) Date of Patent: Mar. 2, 2010

(54) MEMORY CONTROLLER WITH GRAPHIC PROCESSING FUNCTION

(75) Inventors: Young-Jin Chung, Seongnam-si (KR); Jin-Aeon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 330 days.

(21) Appl. No.: 11/302,436

(22) Filed: Dec. 14, 2005

(65) Prior Publication Data
US 2006/0125834 A1    Jun. 15, 2006

(30) Foreign Application Priority Data
Dec. 15, 2004    (KR)    ............ 10-2004-0106394

(51) Int. Cl.
G06T 11/40    (2006.01)
G09G 5/00    (2006.01)
G09G 5/36    (2006.01)
G09G 5/39    (2006.01)
G06F 13/14    (2006.01)
G06F 17/00    (2006.01)

(52) U.S. Cl. .............. 345/552; 345/520; 345/531; 345/545; 345/582; 345/587; 463/31

(58) Field of Classification Search ............ 345/504, 345/520, 522, 531–535, 545–549, 552, 581–587; 463/1–8, 30–31
See application file for complete search history.

(56) References Cited

U.S. PATENT DOCUMENTS

| | | | | |
|---|---|---|---|---|
| 6,144,365 A | * | 11/2000 | Young et al. | 345/600 |
| 6,182,133 B1 | * | 1/2001 | Horvitz | 709/223 |
| 6,630,936 B1 | * | 10/2003 | Langendorf | 345/562 |
| 6,661,424 B1 | | 12/2003 | Alcorn et al. | |
| 6,975,320 B1 | * | 12/2005 | Bentz | 345/428 |
| 2002/0162081 A1 | | 10/2002 | Solomon | |

FOREIGN PATENT DOCUMENTS

JP    2002-099926    4/2002

* cited by examiner

*Primary Examiner*—Xiao M Wu
*Assistant Examiner*—Tize Ma
(74) *Attorney, Agent, or Firm*—Harness, Dickey & Pierce, P.L.C.

(57) ABSTRACT

A memory controller having graphic processing function that includes a graphic processing unit operating in response to a selection signal from a master, and a memory interface for storing outputs of the graphic processing unit in an external memory at and receiving graphic data from the external memory to provide the graphic data to the graphic processing unit.

13 Claims, 5 Drawing Sheets

MEMORY CONTROLLER WITH GRAPHIC PROCESSING FUNCTION

PRIORITY STATEMENT

This U.S. non-provisional patent application claims priority under 35 U.S.C. § 119 to Korean Patent Application 2004-106394 filed on Dec. 15, 2004, the entire contents of which are herein incorporated by reference.

BACKGROUND OF THE INVENTION

A computer graphic system may display various objects, for example, points, lines, polygons, three-dimensional objects, etc. on a display. A texture mapping system of a computer graphic system may perform texture mapping using various received texture data.

Texture data may include texels for a basic unit and may be two-dimensional graphic data showing patterns, materials, convex-concave state, etc. Texture mapping may take a target object having a similar-shaped polygon and place a texture (or a texture map) on a similar-shaped polygon instead of defining details of the object. A plurality of two-dimensional textures may be referred to as mipmaps, which may be prepared for a fast graphic process according to various sizes of dimensional objects.

As the mobile application market becomes larger, there may be an increased demand for multimedia functions including various graphic processes in mobile devices like cellular phones, PDA phones, etc.

Conventionally, mobile devices may have limitations including, but not limited to, memory size and/or hardware gate size. Accordingly, when a graphic process is carried out at real-time in mobile devices, the mipmaps for the three-dimensional graphic process may not be stored in the limited memory. Thus, calculations for generating the mipmaps may be performed in a central processing unit (CPU). As a result, the time required for graphic processing and/or power consumption may increase.

For example, at rendering, which is a three-dimensional graphic process, a supersampling may be carried out to achieve a three-dimensional graphic of acceptable quality. When the supersampled textures are downsampled, the CPU and/or other graphic cores may be accessed by software. Therefore, graphic processes may be delayed due to a load of the CPU and/or power consumption may increase.

SUMMARY OF THE INVENTION

An example embodiment of the present invention provides a memory control device. The memory control device may include a graphic processing device configured to perform a graphic process based on a selection signal from a master, and a memory interface configured to store outputs of the graphic processing device in an external memory and receive graphic data from the external memory to provide the graphic processing device.

An example embodiment of the present invention provides a method for use in a memory control device. The method may include receiving at least one selection signal and size/address information from a master device, and performing a graphic process based on the at least one selection signal and the size/address information.

An example embodiment of the present invention provides a downsampling unit. The downsampling unit may include data accumulation logic configured to receive texture data from a master or a memory interface to add texture data based on a downsampling ratio, and a divider configured to divide the added texture data received from the data accumulation logic to calculate an average value.

An example embodiment of the present invention provides a mipmap generating unit. The mipmap generating unit may include a graphic processing control unit configured to receive sizes and addresses of original textures to calculate sizes and addresses of sub-textures, and a memory writing control unit configured to receive the addresses of the sub-textures to a memory interface and select a time to purge the memory interface.

An example embodiment of the present invention provides a memory controller capable of reducing a load of a central processing unit.

An example embodiment of the present invention provides a memory controller performing graphic processes relatively fast regardless of restricted memory size.

BRIEF DESCRIPTION OF THE DRAWINGS

The present invention will become more apparent by describing in detail example embodiments thereof with reference to the attached drawings in which.

DETAILED DESCRIPTION OF EXAMPLE EMBODIMENTS OF THE PRESENT INVENTION

Figure 1:
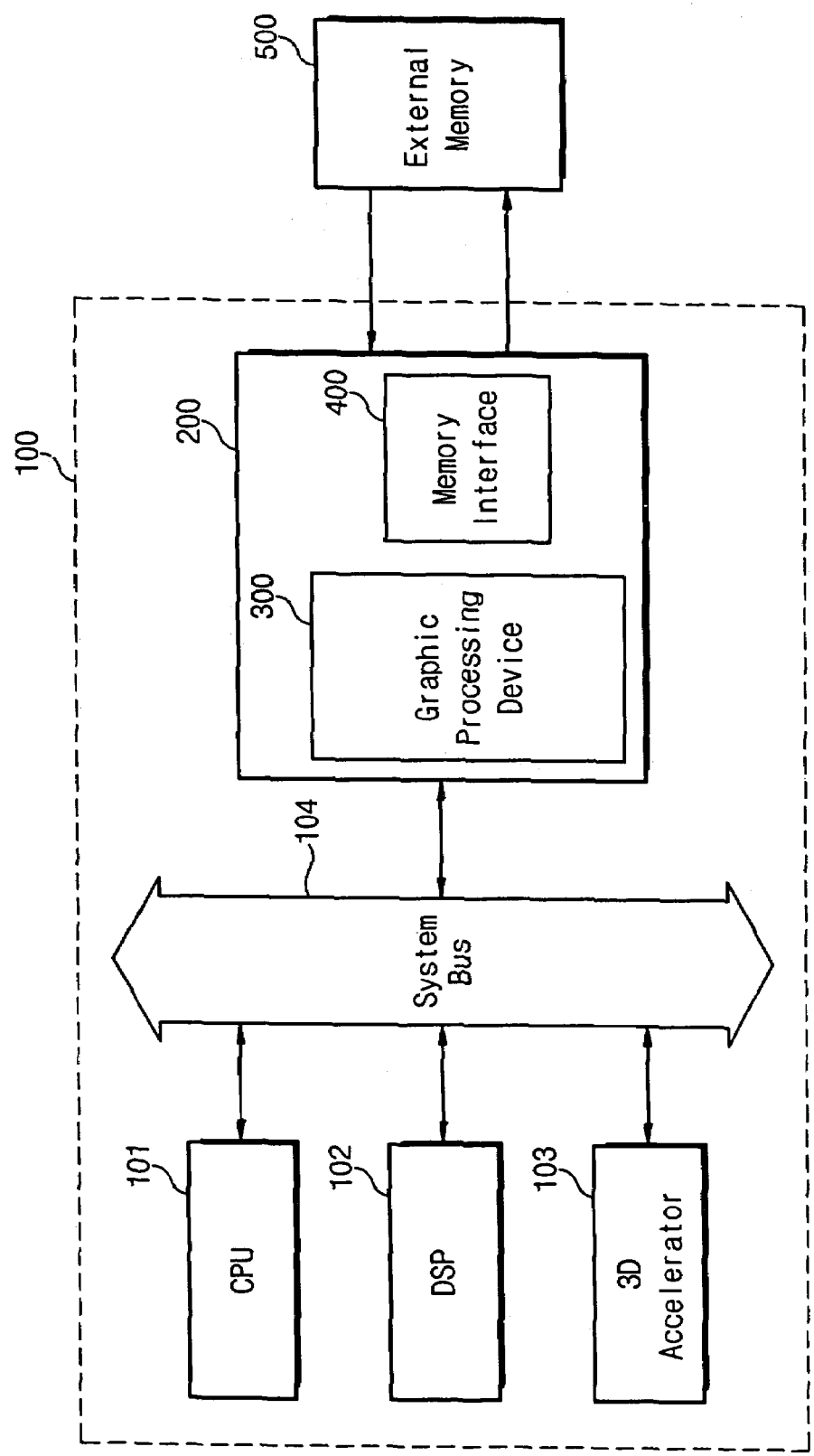
FIG. 1 is a block diagram schematically showing a system-on-chip 100 according to an example embodiment of the present invention.

The present invention will now be described more fully with reference to the accompanying drawings, in which example embodiments of the invention are shown. The invention may, however, be embodied in many different forms and should not be construed as being limited to the example embodiments set forth herein; rather, these example embodiments are provided so that this disclosure will be thorough and complete, and will fully convey the concept of the invention to those skilled in the art. Like reference numerals in the drawings denote like elements.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram schematically showing a system-on-chip 100 according to an example embodiment of the present invention. Referring to FIG. 1, a system-on-chip (SOC) may include one or more masters, for example, a central processing unit (CPU) 101, a digital signal processor (DSP) 102, and a 3D graphics accelerator 103; and one or more slaves, for example, a memory controller 200. Masters 101, 102, and/or 103 and the slave 200 may each be connected to a system bus 104. A digital signal processor 102 is a device for converting digital image data to analog image data. A 3D graphic accelerator 103 may perform a graphic operation providing a graphic to a display device instead of a CPU and may include images, for example, quadrangles, circles, ellipses, etc. A memory controller 200 may serve as an interface between the masters 101, 102, and/or 103 in a system-on-chip 100 and an external memory 500. For example, a memory controller 200 may store data in an external memory 500, and may read data used by one or more masters 101, 102, and/or 103 from an external memory 500. A memory controller 200 may perform graphic operations based on commands from one or more of masters 101, 102, and/or 103. This will be fully explained hereinafter according to an example embodiment of the present invention.

Figure 2:
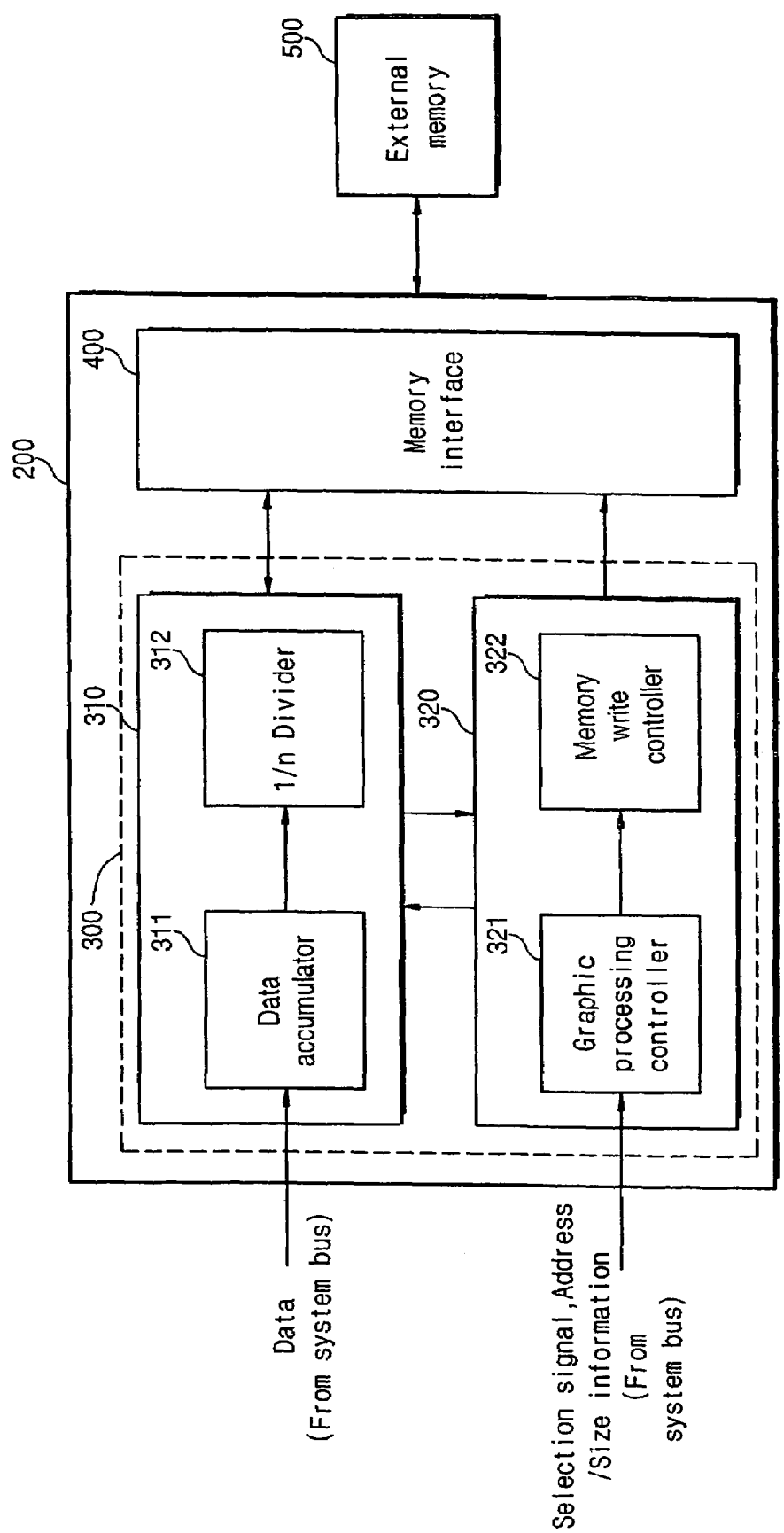
FIG. 2 is a block diagram schematically illustrating an internal organization of the memory controller in FIG. 1 in accordance with an example embodiment of the present invention.

FIG. 2 is a block diagram schematically illustrating an internal organization of a memory controller as shown in FIG. 1 according to an example embodiment of the present invention. Referring to FIG. 2, a memory controller 200 may include a memory interface 400 and/or a graphic processing device 300, which may have one or more buffers. A graphic processing device 300 may include a downsampling unit 310 and/or an auto mipmap generating unit 320. A downsampling unit 310 may include data accumulation logic 311 and/or a 1/N divider 312. A mipmap generating unit 320 may include a graphic processing control unit 321 and/or a memory writing control unit 322.

According to an example embodiment of the present invention, a graphic processing control unit 321 may receive one or more selection signals from one or more masters 101, 102, and/or 103 through a system bus 104 to perform a graphic process, for example, mipmap generation, downsampling, etc.

For example, a central processing unit (CPU) 101 may send selection signals for downsampling supersampled textures, which may include texels and/or size/address information of the supersampled textures to a memory controller 200. A graphic processing control unit 321 in a memory controller 200 may calculate a downsampling number M, a downsampling ratio 1/N, and/or addresses of sub-textures generated by the downsampling in response to the selection signal and/or the size/address information from a CPU 101. A graphic processing control unit 321 may send a downsampling number M, a downsampling ratio 1/N, and/or a first control signal to a downsampling unit 310. The first control signal may be for receiving data to be downsampled from a memory interface 400. A graphic processing control unit 321 may also send address information of an external memory 500 where one or more supersampled textures may be stored and/or a second control signal to a memory interface 400. A second control signal may instruct a memory interface 400 to access an external memory 500 to receive data.

According to an example embodiment of the present invention, a memory interface 400 may read supersampled texture data from an external memory 500 in response to a second control signal. Data accumulation logic 311 of a downsampling unit 310 may receive supersampled textures from a memory interface 400 in response to a first control signal. Further, data accumulation logic 311 may add N number of texels of a texture according to a downsampling ratio 1/N (see FIG. 3). A 1/N divider 312 may divide output of the data accumulation logic 311 according to a ratio of the downsampling 1N to calculate an average value. An average value may be stored in a memory interface 400.

According to an example embodiment of the present invention, a downsampling unit 310 may perform downsampling according to a downsampling number M calculated by a graphic processing control unit 321. For example, when a plurality of supersampled textures are downsampled, the graphic processing control unit 321 may send one or more downsampling numbers M and/or one or more downsampling ratios 1/N related to each texture to a downsampling unit 310.

A memory writing control unit 322 may receive addresses of the sub-textures from a graphic processing control unit 321 to output to a memory interface 400. The memory writing control unit 322 may select a timing when the memory interface 400 is purged and/or refreshed based at least in part on a number of the data lines of the system bus 104.

According to an example embodiment of the present invention, a digital signal processor 102 (see FIG. 1) may transmit selection signals for downsampling and/or size/address information of original images to a graphic processing control unit 321. For example, transmit selection signals and/or size/address information may be used to display original images which may include pixel data on a screen of a display device. At substantially the same time, a digital signal processor 102 may send image data to be downsampled to a downsampling unit 310 of a memory controller 200.

According to an example embodiment of the present invention, a graphic processing control unit 321 may calculate a downsampling number M, a downsampling ratio 1/N, and/or addresses of sub-images generated by the downsampling according to the size/address information in response to selection signals from a digital signal processor 102. A graphic processing control unit 321 may send a downsampling number M and/or downsampling ratio 1/N to a downsampling unit 310.

According to an example embodiment of the present invention, data accumulation logic 311 of the downsampling unit 310 may add values of N pixels of image data input from a digital signal processor 102 according to a downsampling ratio 1/N. Further, a 1/N divider 312 may divide output values of data accumulation logic 311 according to a downsampling ratio 1/N to achieve an average value. A calculated average value may be stored in a memory interface 400. A downsampling unit 310 may perform downsampling according to a downsampling number M calculated by a graphic processing control unit 321. For example, when a plurality of image data are downsampled, a graphic processing control unit 321 may calculate a downsampling number M and/or a ratio of the downsampling 1/N for each image data and may send the downsampling number M and/or a downsampling ratio 1/N to a downsampling unit 310.

A memory writing control unit 322 may receive sub-image data from a graphic processing control unit 321 to output to a memory interface 400. Further, a memory writing control unit 322 may select a timing when the memory interface 400 is purged and/or refreshed based at least in part on a number of data lines of a system bus 104.

Figure 4:
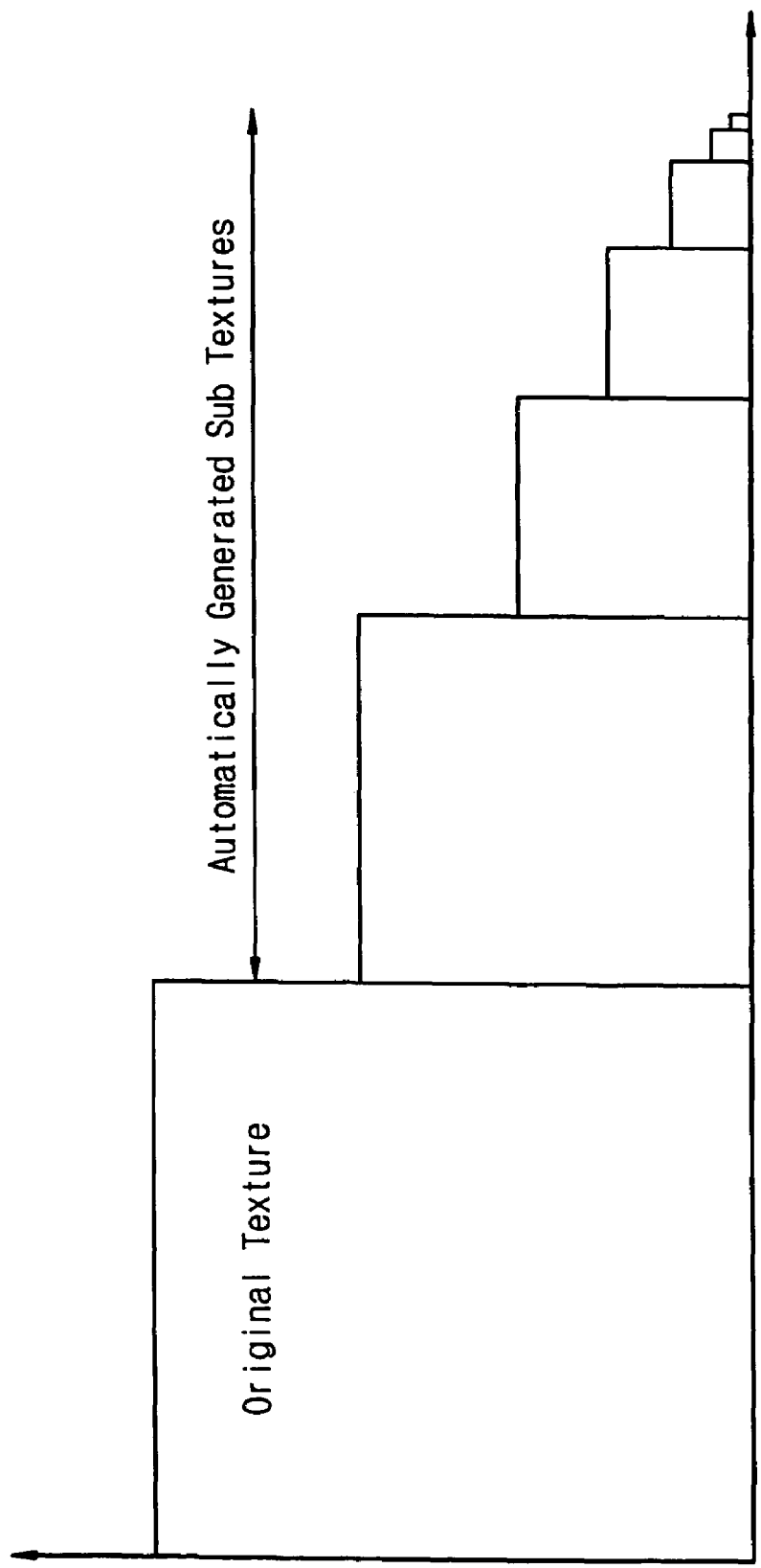
FIG. 4 is a block diagram schematically showing a process in which sub-textures are generated by control of an auto mipmap generating unit in FIG. 2 according to an example embodiment of the present invention.

FIG. 4 is a block diagram schematically showing a process in which sub-textures may be generated by controlling a mipmap generating unit in FIG. 2 according to an example embodiment of the present invention. Referring to FIG. 4, a graphic processing device 300 according to an example embodiment of the present invention may downsample original texture data, which may include multiple texels, until the original texture is divided into a size of one texel and may store each of the divided textures (e.g., sub-textures) to generate a mipmap.

According to an example embodiment of the present invention, a CPU 101 (see FIG. 1) and/or a 3D graphic accelerator 103 may send selection signals for generating a mipmap and/or size/address information of one or more original textures to a graphic processing control unit 321 of memory controller 200. At substantially the same time, a CPU 101 and/or a 3D graphic accelerator 103 may send original texture data to a downsampling unit 310 of a memory controller 200. The graphic processing control unit 321 in the memory controller 200 may instruct the downsampling unit 310 to repeat a downsampling operation until an original texture is divided into one texel size in response to the selection signals and/or size/address information from a CPU 101 and/or a graphic accelerator 103. The graphic processing control unit 321 may calculate sub-textures sizes to be generated, a downsampling number M, a downsampling ratio 1/N, and each of the sub-textures generated by the downsampling. A graphic processing control unit 321 may send information corresponding to a downsampling number M and/or a downsampling ratio 1/N to a downsampling unit 310.

Figure 3:
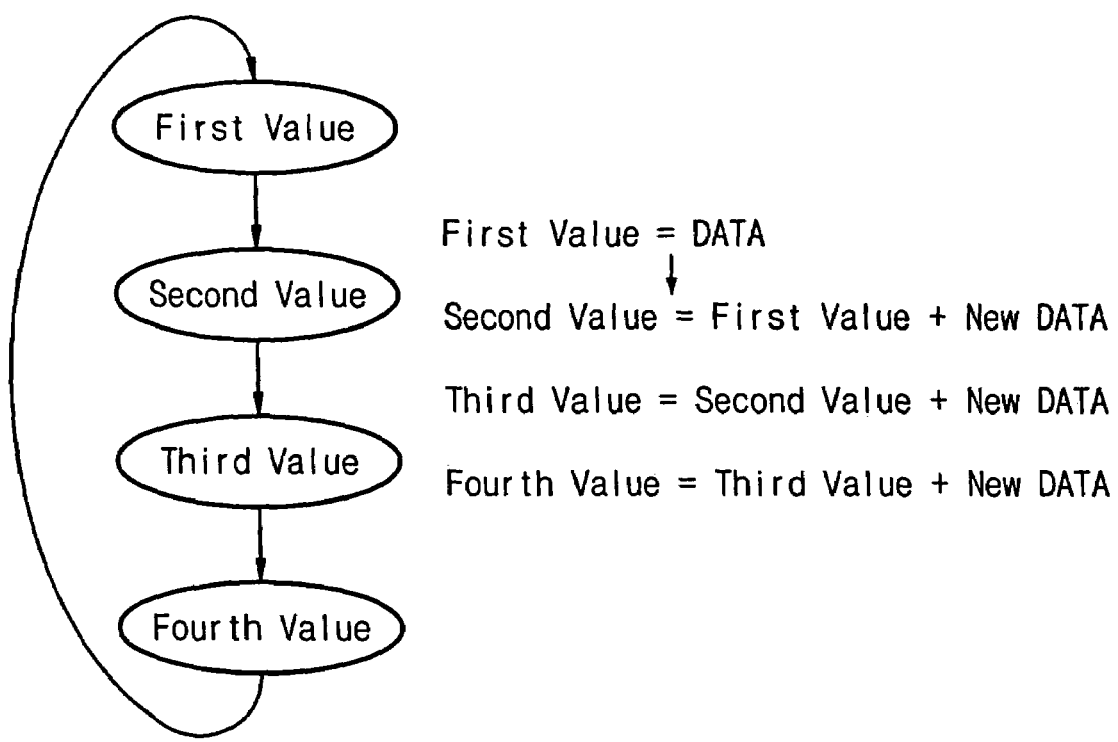
FIG. 3 is a state machine illustrating data accumulation logic in FIG. 2 in accordance with an example embodiment of the present invention.

According to an example embodiment of the present invention, data accumulation logic 311 of a downsampling unit 310 may add values of N texels of the original textured input from a CPU 101 and/or the 3D graphic accelerator 103 (see FIG. 3). Further, 1/N divider 312 may divide one or more outputs of data accumulation logic 311 according to a selected downsampling ratio 1/N to achieve an average value. The average value may be stored in a memory interface 400. The downsampling unit 310 may repeat the downsampling operations in accordance with a downsampling number M that may be calculated by the graphic processing control unit 321.

According to an example embodiment of the present invention, a memory writing control unit 322 may receive addresses of each sub-texture from a graphic processing control unit 321, may send an address to a memory interface 400, and may select a time to purge and/or refresh a memory interface 400 based at least in part on a number of data lines in a system bus 104.

According to an example embodiment of the present invention, mipmaps used in texture mapping of a 3D graphic may be generated by a memory controller having a function of graphic processing without interruption of a CPU 101 if an original texture exists. Therefore, a loading of the CPU 101 may be relieved, and a time for booting images and power consumption may be reduced because a data path is shortened.

Figure 5:
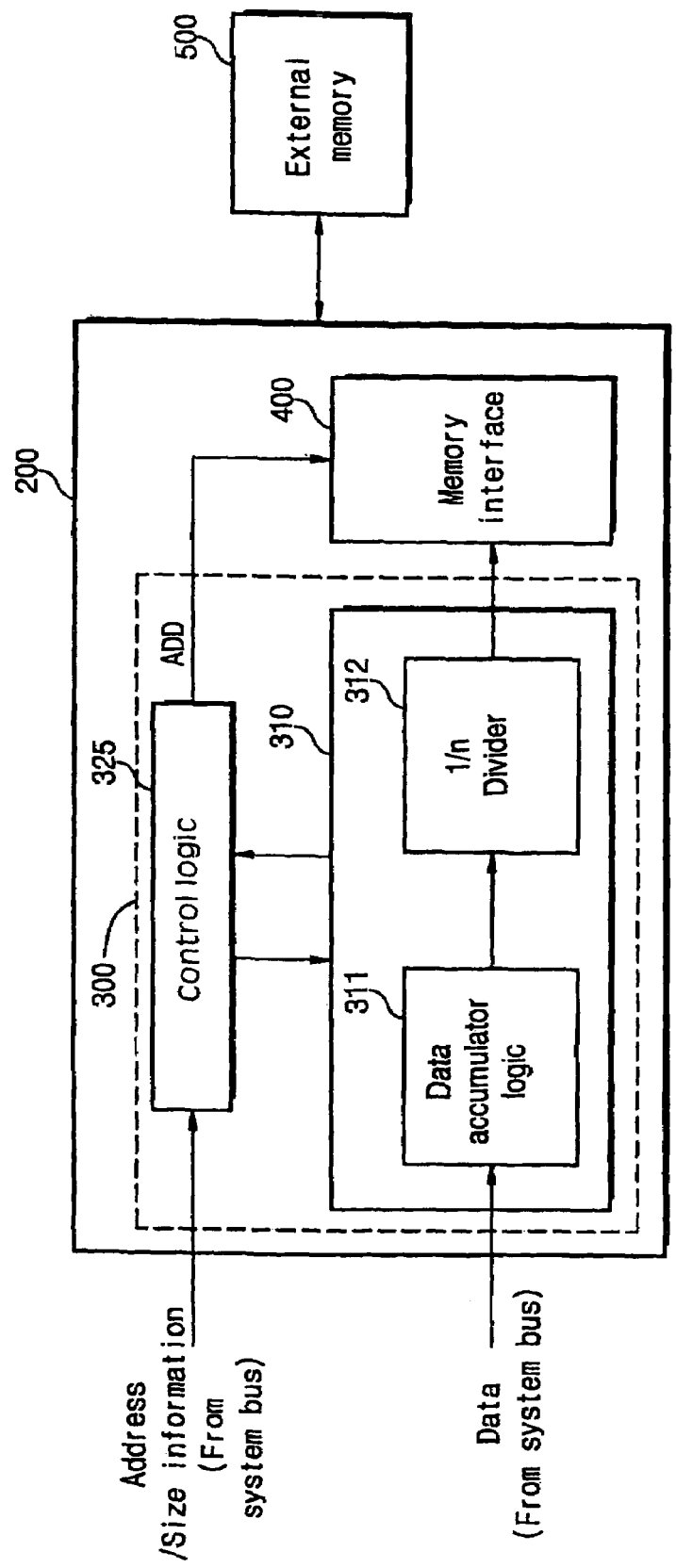
FIG. 5 is a schematic block diagram illustrating an internal organization of the memory controller shown in FIG. 1 according to an example embodiment of the present invention.

FIG. 5 is a schematic block diagram illustrating an internal organization of the memory controller shown in FIG. 1 according to an example embodiment of the present invention. Referring to FIG. 5, a memory controller 200 may include a downsampling unit 310, a control logic 325, and/or a memory interface 400, which may have one or more buffers. A downsampling unit 310 may include data accumulation logic 311 and/or a 1/N divider 312. The control logic 325 may be organized to perform a downsampling operation by receiving an original texture and/or information on size/address of an image from a master 101, 102, and/or 103 through a system bus 104.

According to an example embodiment of the present invention, the main processor (hereinafter, it is referred to as "CPU") 101 in FIG. 1 may send size/address information of supersampled original textures to a memory controller 200 to downsample the supersampled textures, which may include a plurality of texels. Control logic 325 of a memory controller 200 may calculate a downsampling number M, a downsampling ratio 1/N, and/or addresses of sub-textures that may be generated by downsampling. A control logic 325 may send a calculated downsampling number M, information regarding a downsampling ratio 1/N, and/or a first control signal for receiving downsampling data from a memory interface 400 to the downsampling unit 310. At substantially the same time, a control logic 325 may send address information of an external memory 500 where the supersampled textures may be stored and/or a second control signal for receiving data from an external memory 500 to a memory interface 400. A memory interface 400 may read supersampled textures from an external memory 500 in response to a second control signal.

According to an example embodiment of the present invention, data accumulation logic 311 of a downsampling unit 310 may receive supersampled texture data from a memory interface 400 in response to a first control signal, and may add N texels of the textures according to a downsampling ratio 1/N (see FIG. 3). A 1/N divider 312 may divide outputs of a data accumulation logic 311 based on a downsampling ratio 1/N to achieve average values. Average values may be temporarily stored in the memory interface 400. A downsampling unit 310 may perform downsampling according to a downsampling number M calculated by control logic 325. For example, when a number of supersampled textures are downsampled, the control logic 325 may calculate a downsampling number M and a downsampling ratio 1/N in each texture to carry out the downsampling.

Further, control logic 325 may output the addresses of the sub-textures to a memory interface 400 and may select a time when the memory interface 400 is purged and/or refreshed based at least in part on a number of data lines of the system bus 104.

According to an example embodiment of the present invention, a digital signal processor 102 (in FIG. 1) may send a selection signal for starting the downsampling and/or the size/address information of original images to control logic 325 of a memory controller 200 to display original images, which may include a number of pixels corresponding to a desired size in a display screen. At substantially the same time, a digital signal processor 102 may send image data to be downsampled to a downsampling unit 310 in the memory controller 200. Control logic 325 may calculate a downsampling number M, a downsampling ratio 1/N, and/or addresses of sub-image data to be generated by the downsampling in response to a selection signal from a digital signal processor 102 according to size/address information. Control logic 325 may send a calculated downsampling number M and/or a downsampling ratio 1/N to a downsampling unit 310.

According to an example embodiment of the present invention, data accumulation logic 311 of the downsampling unit 310 may add N pixels of the image data received from the digital signal processor 102 based on a downsampling ratio 1/N (see FIG. 3). A 1/N divider 312 may divide outputs of the data accumulation logic 311 to achieve average values according to a downsampling ratio 1/N. The achieved average values may be stored in a memory interface 400. A downsampling unit 310 may perform downsampling according to a downsampling number M calculated by a control logic 325. For example, when image data having a plurality of frames are downsampled, the control logic 325 may send a downsampling number M and/or a downsampling ratio 1/N to a downsampling unit in each image.

According to an example embodiment of the present invention, a control logic 325 may output addresses of sub-image data to a memory interface 400 and may select a time when the memory interface 400 is purged and/or refreshed based at least in part on a number of data lines of the system bus 104.

It should be noted that although three masters are illustrated in FIG. 1, those skilled in the art will recognize that a plurality of masters may perform graphic processes using a memory controller having a graphic processing function.

According to an example embodiment of the present invention, a memory control in a system-on-chip may perform a downsampling function and a mipmap generation function selectively to reduce a loading of a main processor and/or power consumption.

Further, a memory controller may perform a graphic process by generating mipmaps when mipmaps needed for a 3-D graphic process are not stored due to memory storage capacity.

While the example embodiments of the present invention have been particularly shown and described with reference to drawings, it will be understood by those of ordinary skill in the art that various changes in form and details may be made therein without departing from the scope of the present invention.

What is claimed is:

1. A memory control device, comprising:
  a graphic processing device configured to receive at least one of a selection signal, sizes, and addresses information of original textures from a master and perform a graphic process to calculate sizes and addresses of sub-textures without interruption of the master; and
  a memory interface configured to store outputs of the graphic processing device in an external memory and receive graphic data from the external memory to provide the graphic processing device, wherein
  the graphic processing device includes,
    a mipmap generating unit configured to generate mipmaps based on a selection signal from the master, and
    a downsampling unit configured to receive texture data from the memory interface to perform a downsampling process, wherein
    the mipmap generating unit controls the downsampling unit and includes,
      a graphic processing control unit configured to receive sizes and addresses of original textures to calculate sizes and addresses of sub-textures, and
      a memory writing control unit configured to receive the addresses of the sub-textures from the graphic processing control unit to provide the addresses of the sub-textures to the memory interface and select a time to purge the memory interface, wherein
  the time to purge the memory interface is based on a number of data lines of a system bus.

2. The device of claim 1, wherein the downsampling unit includes,
  data accumulation logic configured to receive texture data from the master or the memory interface to add the texture data based on a downsampling ratio, and
  a divider configured to divide the added texture data received from the data accumulation logic to calculate an average value.

3. The device of claim 1, wherein the graphic processing control unit selects the downsampling ratio.

4. The device of claim 1, wherein the master includes a central processing unit and a digital signal processor.

5. The device of claim 1, wherein the graphic processing device performs downsampling based on the selection signal from the master.

6. The device of claim 1, wherein the graphic processing control unit controls the downsampling unit to make a size of the original textures correspond to one texel or one pixel.

7. The device of claim 1, wherein the graphic processing control unit determines a downsampling number of the downsampling unit.

8. The device of claim l, wherein outputs of the downsampling unit are stored in the memory interface whenever the downsampling unit completes one downsampling.

9. The device of claim 1, wherein the graphic data received from the external memory is supersampled texture data.

10. The device of claim 1, wherein the graphic processing device further includes,
  a downsampling unit configured to receive texture data from the master or a memory interface; and
  control logic configured to control the downsampling unit and the memory interface based on a selection signal from a master, the downsampling unit further configured to perform downsampling based on control signals from the control logic.

11. The device of claim 10, wherein the control logic selects a downsampling ratio.

12. The device claim 10, wherein the control logic determines a downsampling number.

13. A graphic processing system, comprising:
  a master processor configured to output a selection signal and size and address information of original textures;
  an external memory configured to store graphic data; and
  a memory control device configured to connect between the master processor and the external memory, wherein
  the memory control device includes,
    a graphic processing device configured to receive at least one of a selection signal, sizes, and addresses information of original textures from the master processor and perform a graphic process to calculate a sizes and an addresses of sub-textures without interruption of the master processor, and
    a memory interface configured to store outputs of the graphic processing device in the external memory and receive graphic data from the external memory to provide the graphic processing device, wherein
    the graphic processing device includes,
      a mipmap generating unit configured to generate mipmaps based on a selection signal from the master, and
      a downsampling unit configured to receive texture data from the memory interface to perform a downsampling process, wherein the mipmap generating unit controls the downsampling unit and includes,
   a graphic processing control unit configured to receive sizes and addresses of original textures to calculate sizes and addresses of sub-textures, and
   a memory writing control unit configured to receive the addresses of the sub-textures from the graphic processing control unit to provide the addresses of the sub-textures to the memory interface and select a time to purge the memory interface, wherein the time to purge the memory interface is based on a number of data lines of a system bus.

* * * * *